No. 861,710. PATENTED JULY 30, 1907.
E. R. CRECELIUS.
BUTTON.
APPLICATION FILED NOV. 27, 1906.

WITNESSES.
A.G. Pieczentkowski.
Walter Edward Goodwin.

INVENTOR.
Emil R. Crecelius
BY Horatio E. Bullon
ATTORNEY.

UNITED STATES PATENT OFFICE.

EMIL R. CRECELIUS, OF PROVIDENCE, RHODE ISLAND, ASSIGNOR TO PARKS BROTHERS AND ROGERS, OF PROVIDENCE, RHODE ISLAND, COPARTNERS.

BUTTON.

No. 861,710.          Specification of Letters Patent.          Patented July 30, 1907.

Application filed November 27, 1906. Serial No. 345,357.

*To all whom it may concern:*

Be it known that I, EMIL R. CRECELIUS, a citizen of the United States, residing at Providence, in the county of Providence and State of Rhode Island, have invented certain new and useful Improvements in Buttons, of which the following is a specification, reference being had therein to the accompanying drawing.

My invention relates to buttons, more particularly to the dumb-bell type.

In buttons of this type, it has heretofore been necessary, in soldering the post to the button head, to apply the solder to the smooth surface of the button head, while manually holding the end of the post against the flat surface of the button. The result was that the solder around the joint of a plated button soon discolored the gold; that the button was weak at the point of the greatest strain, and that only experts were able to position the post even approximately vertical, or at the exact center of the button head.

Figure 1:
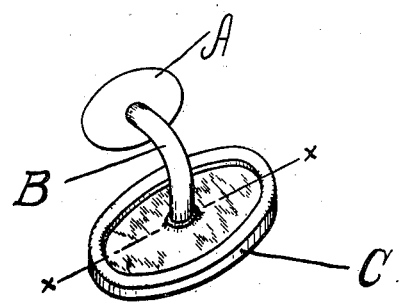
Figure 3:
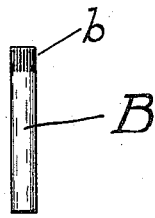
Figure 4:
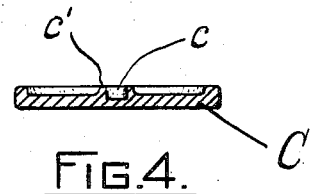
Figure 2:
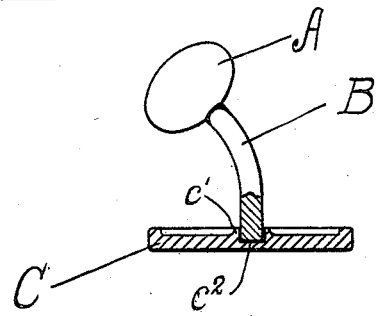

To the end of correcting these weaknesses, my invention consists in the novel construction hereinafter set forth and illustrated in the accompanying drawings, wherein, Figure 1 is a perspective view of my novel button. Fig. 2, a side elevation of the same, showing the head and adjacent portion of the post in central section, Fig. 3, a detail view of a post, and Fig. 4, a transverse section of the head on line $x\,x$ of Fig. 1.

Similar reference letters indicate like parts throughout the views.

In the drawings, A represents the bean, B the post, and C the head of a button, embodying my invention. The bean, A, is fixed to the milled portion, $b$, of the post, B, which is shown as unbent, in Fig. 3, in the usual manner by swaging. By a suitably shaped die, I form a cylindrical orifice, $c$, with a marginal rib, $c'$, in the center of the rear surface of the button head.

A small amount of granular or other unfused solder, $c^2$, is placed in the bottom of the orifice, $c$. The free end of the post is then introduced therein and heat applied to the solder, whereupon the latter fuses and rises or is pressed up around the sides of the post and between the rib, $c'$, and the post. The solder, however, never comes higher than the horizontal plane of the top of the rib.

The post, B, may be bent either before or after the soldering operation in the usual manner.

By this construction the joint of the post with the head is strengthened by the side wall around the end of the post; the solder extends over a greater area and is nowhere exposed, and no trouble is had in centering the post and holding it at the proper angle during the soldering process.

What I claim is,

1. In a cuff button, the combination with the bean and post, of a button head provided with a cylindrical orifice in the center with a rigid unbendable surrounding wall on its rear face to receive the end of the post, and solder in the orifice around the end of the post.

2. As an improved article of manufacture, a cuff button comprising a bean, a post carrying said bean, and a head formed with a cylindrical orifice with rigid surrounding wall, the end of said post being held within said rigid wall, and solder at the bottom of the orifice and around the portion of the post within said walls and holding said post firmly centered on said head.

In testimony whereof I have affixed my signature in presence of two witnesses.

EMIL R. CRECELIUS.

Witnesses:
    HORATIO E. BELLOWS,
    WALTER E. GOODWIN.